A. KINGSBURY.
HORIZONTAL THRUST BEARING.
APPLICATION FILED JAN. 9, 1915.
1,290,234.
Patented Jan. 7, 1919.
2 SHEETS—SHEET 1.
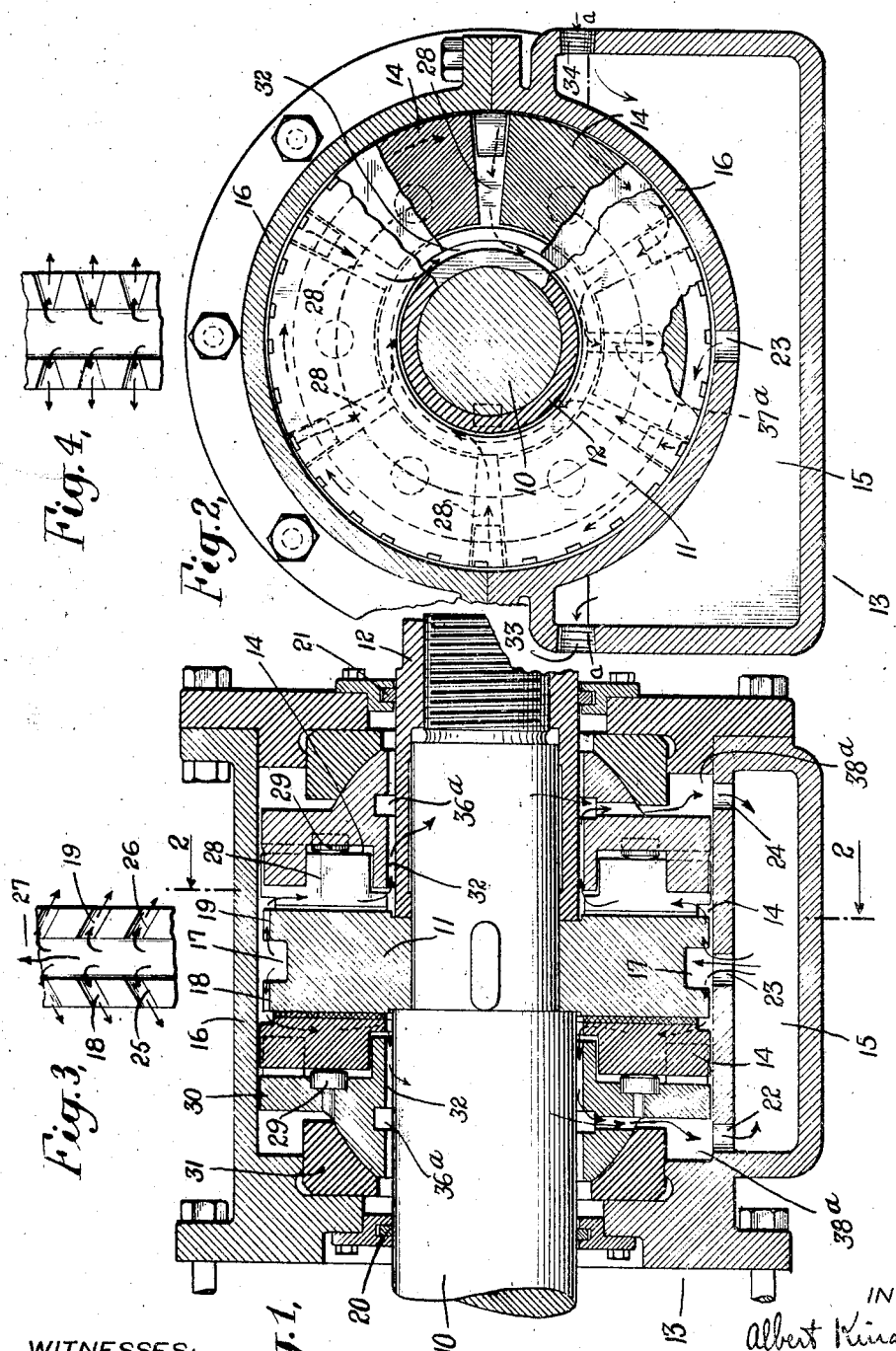
INVENTOR.
Albert Kingsbury
WITNESSES:
E. Cohen
F. Graves
BY
R. J. Barbour
HIS ATTORNEY IN FACT

A. KINGSBURY.
HORIZONTAL THRUST BEARING.
APPLICATION FILED JAN. 9, 1915.

1,290,234.

Patented Jan. 7, 1919.
2 SHEETS—SHEET 2.

WITNESSES:
E. Cohen
F. Graves

INVENTOR.
Albert Kingsbury
BY
R. J. Dearborn
HIS ATTORNEY IN FACT

UNITED STATES PATENT OFFICE.

ALBERT KINGSBURY, OF PITTSBURGH, PENNSYLVANIA.

HORIZONTAL THRUST-BEARING.

1,290,234.   Specification of Letters Patent.   Patented Jan. 7, 1919.

Application filed January 9, 1915. Serial No. 1,318.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Horizontal Thrust-Bearings, of which the following is a specification, reference being had to the accompanying drawings forming a part thereof.

My invention relates to bearings and particularly to means for automatically lubricating such as are adapted to sustain the axial thrust of horizontal shafts.

Thrust bearings such as those set forth in my Patents Nos. 947,242, 1,102,276, and 1,242,948 are adapted to automatically lubricate the thrust bearing surfaces provided oil is supplied to the several bearing shoes. This is readily accomplished by flooding the entire bearing when the axis of the shaft is vertical, but special provision for transferring the oil to the proper points must be made when the bearings are used with shafts which are substantially horizontal.

One object of my present invention is to provide a horizontal thrust bearing that shall embody means for supplying oil to the several bearing shoes and for automatically circulating the oil within the housing whereby the hot oil which comes from the bearing surfaces may be mixed with relatively cold oil before it is again used.

Other objects and advantages of my invention will be set forth hereinafter, and in order that my invention may be thoroughly understood, I will now proceed to describe the same in the following specification and then point out the novel features thereof in appended claims.

Referring to the drawings,

Figure 1 is a longitudinal section of a bearing arranged and constructed in accordance with my invention.

Fig. 2 is a transverse sectional elevation of the same bearing, taken on the line 2—2 of Fig. 1.

Fig. 3 is a detail view showing the propelling slots with which the thrust collar is provided.

A thrust collar having a modified propelling structure is shown in Fig. 4.

Figure 6:
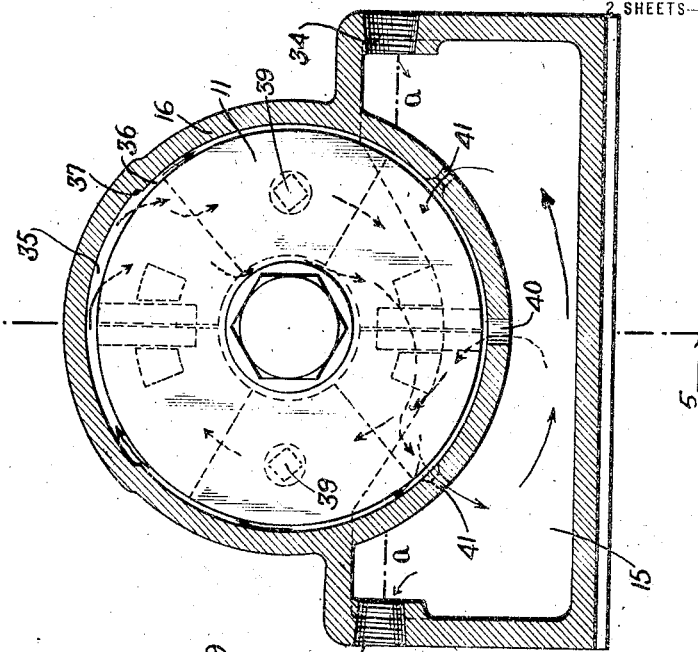
Figure 5:
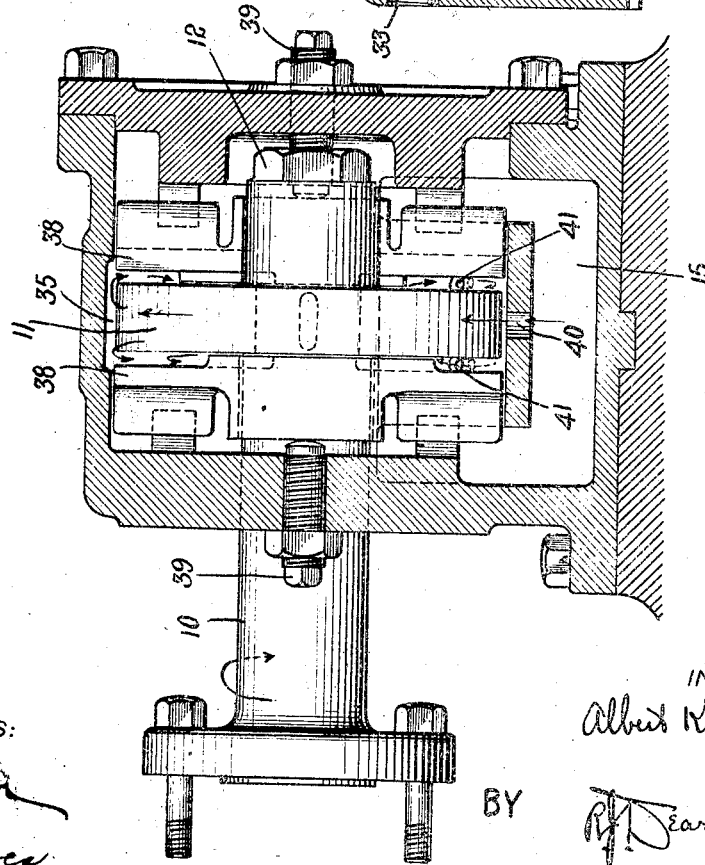

Figs. 5 and 6 are views corresponding respectively to Figs. 1 and 2, of a modified bearing structure which also embodies my invention.

Having special reference to Figs. 1 to 3 of the drawings, the structure here shown comprises a shaft 10 to which a collar 11 is secured by means of a nut 12. A stationary housing 13 surrounds the shaft collar and is provided with tiltably supported bearing shoes 14 which engage the thrust bearing surfaces of the collar and support the end thrust of the shaft.

The housing comprises a hollow base, which constitutes an oil reservoir 15, and a hollow cylindrical box 16 which extends into and communicates with the reservoir and is coaxial with the shaft. Its inside diameter is only slightly greater than the outside diameter of the collar which is located within it.

The collar has an annular groove 17 which is centrally located and divides the outer edge of the collar into two parts. These parts are provided with inclined lateral slots 18 and 19 as clearly shown in Fig. 3.

The arrangement of parts is such that when the reservoir of the housing is filled with oil to substantially the level $a$—$a$, the lower part of the collar is immersed. With the shaft in a horizontal position the oil level cannot be raised any higher without likelihood of the oil flowing out around the shaft although the housing is provided with wiper rings 20—21. It is therefore evident that while the lower bearing shoes are immersed in oil, the upper ones must have the oil supplied to them by some means in order to keep them properly lubricated. In the structure illustrated the annular groove and the inclined slots constitute that means as more fully set forth hereinafter.

The cylindrical box of the housing is provided with openings 22—23—24 of which the opening 23 is directly opposite the annular slot in the collar.

Before describing the modified structures of the succeeding figures, the operation of the structure already described will be discussed. Assuming that the shaft is rotating in a clockwise direction, as shown in Fig. 2, and that the oil is maintained at the level $a$—$a$ as already explained, the oil will be carried up by adhering to the exposed surfaces of the collar and will be thrown outwardly through the inclined slots as indicated by the arrows in Fig. 3. These slots are preferably helical in form although it is only important that the sides marked 25—26 should be approximately helical if the collar is to move in the direction indicated by the arrow 27. If the shaft is likely to rotate in either direction the slots should have the form shown in Fig. 4, both sides being helical in form. As the oil escapes from the slots it must flow radially inward through spaces 28 between the shoes, as indicated by arrows in Figs. 1 and 2, and some of it is carried between the bearing surfaces by reason of the character of the bearing and the mounting of the shoes.

The shoes are each mounted on a pivot 29 and the group of shoes on each side of the collar is supported on a self-adjusting ring 30. This ring has a spherically curved projection which is seated in a base 31.

The details of the shoes and their mounting are covered in my previous patents to which reference has already been made, and as they form no part of my present invention further discussion is believed to be unnecessary.

The spaces 28 are formed by the opposed faces of adjacent shoes and the opposed faces of the self-adjusting ring 30 and the collar 11.

The spaces 28 open into an annular space 32 between the bore of the rings 30 and the surface of shaft 10 and nut sleeve 12. Spaces 32 are provided with annular enlargements 36$^a$ which communicate by means of holes 37$^a$ with annular spaces 38$^a$. These connect with the reservoir by openings 22 and 24. The oil thus flows through the annular spaces between the shaft and the rings and downward beyond the rings into the base through the openings 22 and 24. A circulation of oil is thus established not only through the passages between and adjacent to the shoes but also within the body of oil in the base. The hot oil which is forced out of the bearing surfaces is also mingled with the circulating oil and is carried back into the base. It is therefore cooled and prepared to be used again. In order to facilitate the cooling of the oil in the reservoir any suitable heat transferring device may be used, inlet and outlet pipe connections being effected at 33 and 34.

Referring to Figs. 5 and 6, the structure here shown is similar in many respects to that of the previous figures, and corresponding parts are designated by the same reference characters. The collar in this construction is not grooved or slotted but the housing is provided with a recess 35 at the top which constitutes a chamber and collects oil which is carried upwardly on the exposed surfaces of the collar. A portion of the oil from this chamber passes downwardly through the narrow opening 36 (see Fig. 6) but a greater portion of it flows down freely over the sides of the collar against the radial edges of the bearing surfaces on account of the location of the shoulder 37 of the recess.

The arrangement of bearing shoes shown in Figs. 1 and 2, or some other suitable structure, may be employed but this lubricating arrangement is particularly adapted for use with the bearing illustrated in Figs. 5 and 6 which comprises two semi-annular shoes 38 on each side of the thrust collar. The shoes are tiltingly supported on pivots 39 and the bearing surfaces are located one on each side of the shaft and each engage about a quarter of the thrust surface on one side of the collar. This two-shoe bearing structure is set forth and described in detail in my copending application Serial No. 1319 filed of even date herewith.

The cylindrical housing box is provided with an inlet opening 40 which corresponds to the opening 23 and two pairs of openings 41 which are slightly below the surface of the oil in the base and open into the box on the respective sides of the collar as clearly shown in Fig. 5.

In operation the oil is impelled as hereinbefore set forth and after lubricating the bearing surfaces, passes outwardly through one set of the openings 41 into the base. Through the other set of openings oil enters the box as indicated by the arrows in Fig. 6. A circulation of oil is thus established through the base as well as through the spaces around the shoes.

As in the construction shown in Figs. 1 and 2, the oil in the reservoir may be cooled by any suitable means.

Attention is directed to the fact that in both the structures shown herein the housing is constructed to closely embrace the peripheral surface of the thrust collar so as to leave only a narrow annular oil passage between the housing and the said surface; and that the oil which is carried up through this annular passage by the rotation of the collar is deflected laterally to each side of the collar by transverse projections or ribs formed upon either the housing member or the collar member; and is by the action of these ribs directed against the edges of the bearing shoes and caused to flow downwardly over their edges toward the center of the bearing. In the construction shown in Figs. 1 to 4, the lateral deflection of the oil against the edges of the shoes is effected by the transverse edges or shoulders 25 of the grooves or slots, 18, 19, etc.

In the construction shown in Figs. 5 and 6 the corresponding edges—which perform the oil deflecting function—are the transverse shoulders formed by the end walls of the recess 35. In both cases the oil deflected laterally by these edges or shoulders is thrown directly against the advanced edges of the shoes 14—on the sides toward which the collar is revolving as clearly shown by the arrows in Figs. 1, 2, 5 and 6. These transverse rib elements may be generally designated as deflector elements or as lateral deflectors; and they perform their desired functions without any actual scraping action or any direct contact between the relatively fixed and relatively rotating surface on which they are positioned and in conjunction with which they operate.

While the bearing structures shown and described herein are arranged to provide for a radially inward flow of the oil across the thrust bearing surface between and around the bearing shoes, this feature in itself is not a part of my present invention and is covered in my patent reissue (original 1,201,057) of which the original application was copending with this application.

What I claim is:

1. The combination with a horizontal shaft and a collar thereon having a thrust surface and a substantially cylindrical outer surface, of thrust bearing members, a hollow cylindrical housing surrounding the cylindrical surface of the collar to form a narrow annular passage, and a fluid containing reservoir into which the bottom of the collar extends, one of the parts which coöperate to form the narrow annular passage being arranged to embody means for causing the liquid taken up by the collar when rotating to flow laterally at the top of the collar and downwardly to lubricate the bearing members.

2. The combination with a horizontal shaft and a collar thereon having a thrust surface and a substantially cylindrical outer surface, of thrust bearing members, a hollow cylindrical housing surrounding the cylindrical surface of the collar to form a narrow annular passage, and a fluid containing reservoir into which the bottom of the collar extends, said housing being recessed at the top to form a chamber in communication with the annular passage.

3. A horizontal thrust bearing comprising a hollow cylindrical housing, an oil reservoir for flooding the lower part of the housing, a horizontal shaft extending into the housing, and a thrust collar within the cylindrical housing on the shaft, said collar and housing being formed to provide a narrow annular oil passage around the collar, and embodying means for causing the oil taken up by the collar when rotating to flow laterally at the top of the collar and downwardly to lubricate the thrust bearing surfaces.

4. In a thrust bearing, the combination with a rotatable member having a substantially horizontal axis, a thrust surface and a circumferential surface; relatively stationary thrust bearing members coöperating with the thrust surface; an oil chamber into which the lower part of the rotatable member extends; and a stationary member close to the circumferential surface of the rotatable member and embodying means for causing the oil taken up by the rotatable member to flow downwardly over the thrust bearing surface.

5. A thrust bearing comprising a rotatable member having a substantially horizontal axis and a thrust surface; a relatively stationary tiltable bearing shoe; an oil chamber into which the lower part of the rotatable member extends; and deflector elements arranged transversely of the said rotatable member and adapted to remove the oil from the surface thereof and direct it onto the bearing surfaces.

6. A thrust bearing comprising a rotatable thrust member having a circumferential surface, a substantially horizontal axis, and a radial bearing surface; a tiltable bearing shoe coöperating with the thrust surface; an oil containing reservoir into which the rotatable member extends, and transverse deflector elements coöperating with the circumferential surface for laterally diverting the oil carried upwardly on the rotatable member and directing it onto the bearing surfaces.

7. In a thrust bearing, the combination of a shaft having a thrust collar; an oil well in which the lower portion of the thrust collar extends; a tiltable bearing shoe coöperating with the thrust collar; and means for deflecting oil from the outer surface of the collar as it rotates and directing it against the sides of the bearing shoe.

8. In a thrust bearing the combination of a substantially horizontal shaft having a radial thrust surface and a circumferential oil carrying surface; relatively stationary bearing shoes coöperating with the thrust surface; and deflecting means for discharging oil from the circumferential oil carrying surface and directing it to the bearing shoes.

9. In a thrust bearing the combination of a substantially horizontal shaft having a radial thrust surface and a circumferential oil carrying surface; relatively stationary bearing shoes coöperating with the thrust surface; and a stationary deflector element arranged in close proximity to the circumferential surface of the collar and adapted to collect the oil therefrom and deflect it onto the bearing surfaces.

In witness whereof, I have hereunto set my hand in the presence of two subscribing witnesses, this 4th day of January, 1915.

ALBERT KINGSBURY.

Witnesses:
C. W. McGHEE,
M. R. MacMILLAN.